Oct. 17, 1967  C. L. BAKS ET AL  3,347,164
MULTIPLE PERFORATION SHAPED CHARGE
Filed May 6, 1966

Claude L. Baks
Pierre M. Chesnel
INVENTOR.

BY

ATTORNEY 3,347,164
MULTIPLE PERFORATION SHAPED CHARGE
Claude L. Baks, Paris, and Pierre M. A. Chesnel, Savigny-sur-Orge, France, assignors to Societe de Prospection Electrique Schlumberger, S.A., Paris, France, a corporation of France
Filed May 6, 1966, Ser. No. 548,249
Claims priority, application France, May 18, 1965, 17,462/65
7 Claims. (Cl. 102—24)

ABSTRACT OF THE DISCLOSURE

This application discloses shaped charge devices for simultaneously producing a plurality of small perforations. To accomplish this, a number of individual shaped charges are arranged in a compact group in an enclosed container with each charge being isolated from the other but with the rearward end of each charge being operatively associated with a common detonating charge.

---

Figures 1, 2:
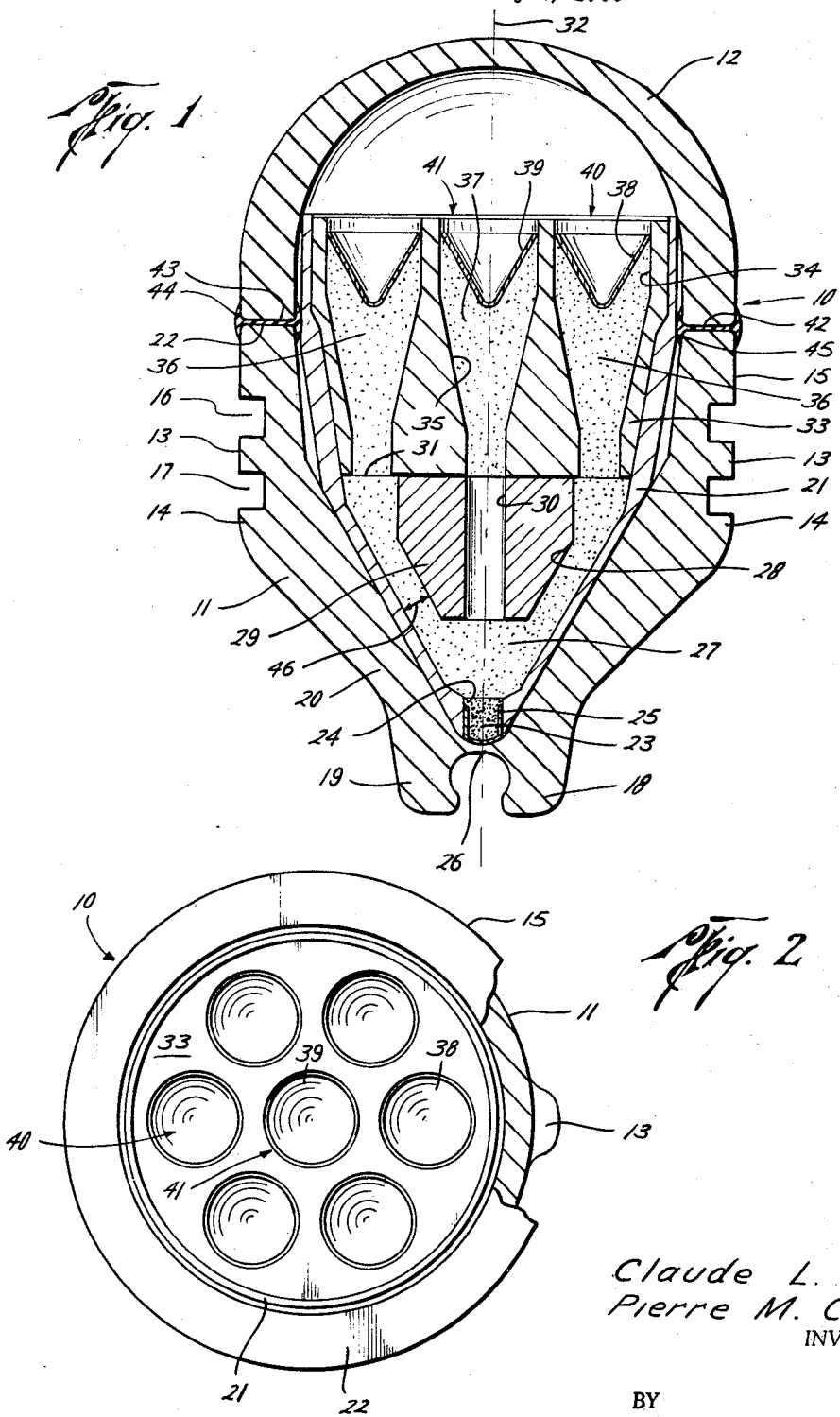

Accordingly, as will subsequently become more apparent, this invention relates to shaped charges; and, more particularly, to shaped charges for producing a plurality of closely spaced diminutive perforations in a well bore.

In completing a typical oil well, one or more perforations (usually of a diameter of ¼-inch or more) are made as required through the casing and sheath of cement therearound to establish communication with the producible earth formations. These perforations are customarily made by shaped charge apparatus such as that shown, for example, in Patent Nos. 3,048,101, 3,048,102 or 3,100,443.

Where the formations are reasonably firm, the resulting perforations into the earth will generally maintain their shape with little or no formation material being loosened and swept into the well bore as fluids are being produced. On the other hand, it is not at all uncommon for a producible formation to be of a loose, unconsolidated material, such as sand or the like. When fluids are produced from such unconsolidated formations, the perforations therein will collapse and particles of the formation material will be carried by the produced fluids through normally sized perforations in the casing and cement and on into the well bore. Among other problems caused by this, the well pumping equipment will in time become plugged or worn and must, of course, be repaired.

To counter such undesirable effects of unconsolidated formations, various measures have been employed heretofore. One procedure, for example, involves setting of perforated screens along with the casing that will be adjacent to such unconsolidated formations and hold back loose formation particles. In addition to requiring prior knowledge of the exact location of the unconsolidated formations, such screens require special handling as well as time-consuming and costly operations. In another procedure for controlling unconsolidated formations, the casing is perforated in the usual manner and a settable fluent material, such as one of several specially arranged flowable plastics or the like, is injected in one manner or another through the perforations and into the formations. Once this plastic has solidified, it is arranged to bond the loose particles together and leave open interstitial spaces through which formation fluids can be produced. Although many of these plastics have been successfully employed, the added expense of the plastic as well as the injection operation represents a significant cost factor.

It is, therefore, an object of the present invention to provide shaped charge apparatus for producing a plurality of closely spaced diminutive perforations through the casing and cement that are of such a small diameter that formation fluids can be produced from unconsolidated formations with little or no eluviation of loose earth formation materials into the well bore.

This and other objects of the present invention are obtained by providing shaped charge apparatus having an outer case in which is confined a massive body in the forward portion thereof having a plurality of symmetrically arranged longitudinal cavities each receiving a shaped charge and disposed in front of common detonating means in the rearward portion of the case.

The novel features of the present invention are set forth with particularity in the appended claims. The present invention, both as to its organization and manner of operation together with further objects and advantages thereof, may best be understood by way of illustration and example of certain embodiments when taken in conjunction with the accompanying drawings, in which:

FIG. 1 is an elevational view in cross-section showing an exemplary shaped charge device arranged in accordance with the present invention; and FIG. 2 is a view showing the forward end of the shaped charge device of FIG. 1 before its cap is placed thereon.

Turning now to FIG. 1, a typical embodiment is shown of a shaped charge device 10 arranged in accordance with the present invention. The shaped charge device 10 includes a two-part outer case comprised of a generally cylindrical hollowed container 11 and a dished hemispherical front cover 12. Although means, such as those shown in the above-mentioned patents, can be used for securing the shaped charge device 10 to a support it is preferred to provide lateral lugs 13 and 14 on each side of the container 11 that are longitudinally spaced from one another and a peripheral flange 15 at the forward end of the container 11. In this manner, longitudinally spaced gaps 16 and 17 are formed for alternatively receiving spaced wires (not shown) as described in U.S. Patent No. 3,282,213. Two spaced-apart, rearwardly directed lugs 18 and 19 are provided on the rear wall 20 of the container 11 for receiving a detonating cord (not shown) and securing it against the outer surface at the center of the container's rear wall.

Although other materials can, of course, be used, it is preferred to form the container 11 and cover 12 from a compressed, powdered ceramic material composed of more than about 86 percent aluminum oxide by weight as disclosed in U.S. Patent No. 3,276,369. Cases of such ceramic material not only possess the desirable debris and corrosion-resistance characteristics of prior-art glass cases, but also retain the strength and trouble-free nature of conventional aluminum cases. It has been found that the aluminum oxide content of this material must be greater than about 86 percent to insure that the cases have sufficient oxide content of the ceramic material should be about 94 to 96 percent.

For reasons that will subsequently be described in greater detail, enclosed within the container 11 is a generally complementary fitting shell 21 of a massive material, such as lead or the like, that lines the inner wall of the container and projects slightly ahead of the forward marginal surface 22 of the peripheral flange 15. A suitable high explosive 23, such as RDX, is loosely disposed in an axial bore 24 through the rearwardmost apical end of the shell 21 and serves as a booster charge. If desired, the booster explosive 23 may be within an open cup-like shell 25 of a thin metal. The booster explosive 23 is, of course, placed against the rear wall 20 of the container 11 so as to be separated from the detonating cord (not shown) by only a thin web 26 of material.

The rearward half of the shell 21 receives a body of a suitable secondary high explosive 27, such as RDX or the like, that is disposed immediately in front of the booster charge 23 and has an axial cavity 28 having an open, cylindrical forward portion and a closed, generally frusto-conical rearward portion in which is received a complementarily shaped plug 29 of lead or some other massive material. An axial bore 30 is formed through the lead baffle plug 20 for reasons that will be subsequently explained. The forward face 31 of the explosive body 27 and baffle plug 29 is made substantially planar and perpendicular to the central axis 32 of the shaped charge device 10.

The remainder of the lead shell 21 receives a generally cylindrical massive body 33, also of lead and the like, that has a plurality of tapered bores, as at 34, therethrough that are parallel to and uniformly spaced in a generally symmetrical arrangement about a similarly tapered axial bore 35 through the cylindrical body 33. The rearward portions of these tapered bores 34 and 35 are generally cylindrical until merging with forwardly diverging intermediate bore portions that in turn merge with cylindrical forward portions of a larger diameter than their rearward bore portions. Disposed in each of the bores 34 and 35 is a complementarily fitting explosive charge 36 and 37 of a secondary high explosive, such as RDX, with each of these charges having its forward end hollowed for respectively receiving a conical or frusto-conical liner, as at 38 and 39, of a typical suitable material, such as copper or the like, for providing a plurality of shaped charges 40 and 41.

To enclose the shaped charge device 10, the rearward marginal surface 42 of the domed cover 12 and the forward marginal surface 22 of the container 11 are liberally coated with an appropriate hardenable or firming adhesive 43 such as, for example, an epoxy resin. As the container 11 and cover 12 are brought together during assembly, the adhesive 43 will be radially extruded to form annular beads 44 and 45 around and inside of the junction of the abutting marginal surfaces 22 and 43. Other methods of sealing the shaped charge device 10 can, of course, be employed as preferred.

Encapsulated shaped charges typically include a booster explosive within the case and arranged to be detonated whenever a detonating cord against the outside of the case is detonated. Although the explosive energy released upon detonation of the detonating cord is somewhat reduced as it is transmitted through the case to the booster explosive, there is no particular problem in detonating shaped charges contained in cases of either aluminum or glass. It has been found, however, that the transmission factor or "Q" of the above-described high-strength ceramic materials is so low that a conventional detonating cord apparently cannot reliably induce a high-order detonation through a case of this material. Thus, although it is generally recognized that ceramic materials have such superior properties, these materials have not been successfully employed for shaped charge cases until just recently because of the apparent inability to reliably induce a high-order detonation through a ceramic material of this nature.

Accordingly, as more fully described in the aforementioned Bell patent, to ensure reliable high-order detonation of a shaped charge in a case of such high-strength ceramic material, it is necessary to employ an "induction distance mechanism." The term "induction distance" as used herein is the axial distance that an explosive shock wave commencing at one end of a column of a first explosive material must travel along the column before attaining sufficient velocity to induce a high-order detonation in a second explosive material disposed in intimate contact therewith. The particular factors generally governing the induction distance for a particular explosive detonated by a given level of explosive energy are its grain size, its degree of compaction and confinement, and, to some extent, the approximate lateral dimensions of the column.

To illustrate the induction distance mechanism, assume that a first detonating explosive is disposed against one side of a solid wall and that a column of a second explosive is extended away from the opposite side of the wall to a third explosive which is to be detonated. It will be appreciated, of course, that for the detonation of the first explosive to induce a detonation of the second explosive, at least a particular minimum level of explosive energy must be transferred through the wall. Similarly, before the third explosive will detonate, the second explosive must develop sufficient explosive energy to detonate that third explosive. Thus, should either the explosive energy transferred through the wall or that generated by the second explosive be insufficient, the third explosive will either fail to detonate at all, or, at best, detonate only at low-order.

Inasmuch as explosive energy diminishes exponentially as its distance from the source increases, the booster explosive may be detonated slightly below high-order even where a conventional case is used and the wall is very thin. In such instances, however, only a small amount of booster explosive is needed to bring the shock wave up to high-order detonating velocity; and no particular attention need be given to the arrangement of the booster in a conventional case.

It will be appreciated, therefore, that should the web 26 at rear wall 20 of the container 11 of the present invention be too thick, substantially all of the explosive energy will be dissipated or attenuated within the wall itself. Thus, since the high-strength ceramic material used in the present invention greatly attenuates explosive energy, the thickness of the web 26 becomes critical as well as making it essential that there be sufficient induction distance for the booster explosive 23 and explosive 27 to ensure high-order detonation of the shaped charges 40 and 41. It was found, therefore, that the approximate maximum thickness for the web 26 is 0.050 to 0.055-inch for standard detonating cord. Reliable high-order detonation by conventional detonating cords could not be achieved at greater web thicknesses. Although the design pressure will be a factor, it is preferred to hold the thickness of the web 26 to about 0.020 to 0.030-inch. This is suitable for even very high well pressures and does not complicate manufacture of the container 11.

It has been found that to contain the shaped charges 40 and 41, the shaped charge device 10 of the present invention is of a sufficient size (e.g., an outer diameter of $1^{15}/_{16}$ inches and an overall length of 3 inches as in one typical embodiment) to provide an adequate columnar length of the loosely disposed booster explosive 23 for it to detonate the intermediate explosive charge 27 reliably and this charge to in turn reliably induce a high-order detonation in each of the shaped charges. Although it is not known at what point the progressively moving detonating front actually achieves high-order velocities, high-order detonation is apparently realized by the time the detonation front reaches the planar surface 31 so as to reliably develop perforating jets from the shaped charges 40 and 41. It will be appreciated, of course, that in keeping with the teachings of the aforementioned copending Bell patent, this high-order detonation can be obtained in other sizes of the device 10 by adjusting the various parameters of the induction distance as, for example, the annular clearance 46 between the opposed walls of the liner 21 and plug 29 and/or the degree of compaction of the intermediate charge 27.

In the above-mentioned typical embodiment, the shaped charge device 10 is loaded by pre-forming the intermediate explosive 27 and disposing it and the baffle plug 29 on top of the loose booster charge 23. The several shaped charges 40 and 41 are also pre-loaded into the forward body 33 and disposed above the intermediate explosive 27 and baffle 29. Then, a sufficient thrust is applied by a suitable loading tool (not shown) to press the several liners 38 and liner 39 simultaneously into place and secure the various explosives 36, 37 and 27 in their respective confining body 33 and the liner 21. The cover 12 is then put in position and secured to the container 11 as described above.

It will be recognized, of course, that although the lead liner 21 is not essential, it provides an extra degree of confinement to further enhance the performance of the shaped charge device 10. Moreover, by using lead, the liner 21, the plug 29 and the body 33 will all be suitably disrupted upon detonation of the device 10 as not to leave objectionable debris in a well. Other materials, such as copper or other materials, can be utilized for one or more of the liner 21 as well as the confining body 33 and baffle 29. Similarly, it will be recognized that the baffle plug 29 could be made integral with the cylindrical confining body 33.

Turning now to the operation of the shaped charge device 10 of the present invention. Although there will, of course, be some cross-interference between the simultaneously advancing perforating jets of adjacent ones of the outer shaped charges 40, it has been found that simultaneous detonation of the central shaped charge 41 therewith will significantly affect the overall performance of all of the shaped charges.

Accordingly, to minimize the effects of cross-interference between their perforating jets, detonation of the central shaped charge 41 is slightly retarded with respect to the detonation of the outer shaped charges 40. This delay is accomplished by not filling the axial bore 30 in the plug 29 with explosive. Thus, upon detonation of the intermediate explosive 27, the detonation front will progress in the usual manner through the annular space 46 and detonate the outer shaped charges 40 simultaneously. When the detonation front reaches the rearward end of the empty axial bore 30, however, it will be somewhat attenuated by the air gap therein so as to slightly retard detonation of the central shaped charge 41 until shortly after detonation of the outer shaped charges 40.

It will be appreciated that the central shaped charge 41 can be omitted if desired. Where this is done, the central tapered bore 35 is also omitted and better confinement is provided for the outer shaped charges 40 by virtue of the added mass of metal in the confining body 33. It should also be noted that, where the central shaped charge 41 is not included in the shaped charge device 10, it is not necessary to employ the baffle plug 29; nor, even if the plug is included, is it necessary to include the axial bore 30 therethrough.

Accordingly, it will be appreciated that by arranging shaped charge apparatus in accordance with the principles of the present invention, a plurality of closely shaped diminutive perforations will be obtained. In this manner, no one perforation will be of sufficient diameter to pass a significant quantity of loose formation materials but the total cross-sectional area of all of the perforations will be sufficient for adequate flow of producible formation fluids.

While particular embodiments of the present invention have been shown and described, it is apparent that changes and modifications may be made without departing from this invention in its broader aspects; and, therefore, the aim in the appended claims is to cover all such changes and modifications as fall within the true spirit and scope of this invention.

We claim:

1. Shaped charge apparatus comprising: a case having a cavity therein uniformly disposed about a central axis; explosive-confining means including a body coaxially received in the forward portion of said cavity and having an axial bore and a plurality of longitudinal bores therein symmetrically arranged around said central axis; first and second shaped explosive means having a liner in their forward end and respectively received in said axial bore and in each of said longitudinal bores; means received in the rearward portion of said cavity for initiating detonation of said shaped explosive means; and means between said detonation-initiating means and said first shaped explosive means for retarding its detonation in relation to the detonation of said second shaped explosive means.

2. The apparatus of claim 1 wherein said retarding means includes a space between said detonation-initiating means and said first shaped explosive means.

3. The apparatus of claim 1 wherein said detonation-initiating means includes explosive means disposed in said rearward cavity portion and having a forward transverse planar surface contiguous with the rearward end of said shaped explosive means.

4. The apparatus of claim 3 wherein said detonation-initiating explosive means has a cavity coaxially disposed in said forward surface and said retarding means includes a solid body disposed in said coaxial cavity and having an axial bore therein between said detonation-initiating explosive means and said first shaped explosive means.

5. Shaped charge apparatus comprising: a cylindrical hollowed case having a cavity uniformly disposed about a central longitudinal axis open at one end and having a wall closing the other end thereof; explosive-confining means including a body coaxially received in the forward portion of said cavity and having an axial bore and a plurality of longitudinal bores therein symmetrically arranged around said central axis; first and second shaped explosive means having a liner in their forward ends and respectively received in said axial bore and in each of said longitudinal bores; means for initiating detonation of said shaped explosive means including first explosive means received in the rearward portion of said cavity and having a forward transverse planar surface contiguous with the rearward end of each of said shaped explosive means, and second explosive means at the rear of said first explosive means; and means between said detonation-initiating means and said first shaped explosive means for retarding its detonation in relation to the detonation of said second shaped explosive means and closure means for fluidly sealing said open end of said case.

6. The apparatus of claim 5 wherein said first explosive means has a cavity coaxially disposed in said forward surface and said retarding means includes a solid body disposed in said coaxial cavity and having an axial bore therein between said first explosive means and said first shaped explosive means.

7. The apparatus of claim 6 wherein said confining means further includes a metal lining around the walls of said cavity in said case.

References Cited

UNITED STATES PATENTS

| 2,628,559 | 2/1953 | Jasse | 102—24 |
| 2,898,085 | 8/1959 | Borins et al. | 102—24 |
| 3,013,491 | 12/1961 | Poulter | 102—20 |

FOREIGN PATENTS

| 1,328,393 | 4/1963 | France. |

BENJAMIN A. BORCHELT, *Primary Examiner.*

SAMUEL FEINBERG, *Examiner.*

V. R. PENDEGRASS, *Assistant Examiner.*